(12) United States Patent
Wu et al.

(10) Patent No.: US 12,738,239 B2
(45) Date of Patent: Sep. 15, 2026

(54) IMAGE PROCESSING METHOD, IMAGE PROCESSING SYSTEM, AND DISPLAYER

(71) Applicant: Realtek Semiconductor Corporation, Hsinchu (TW)

(72) Inventors: Cian-Rou Wu, Hsinchu (TW); Yu-Pin Chou, Hsinchu (TW); Tzuo-Bo Lin, Hsinchu (TW); Cheng Yueh Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 18/953,079

(22) Filed: Nov. 20, 2024

(65) Prior Publication Data

US 2025/0308468 A1 Oct. 2, 2025

(30) Foreign Application Priority Data

Mar. 29, 2024 (TW) ................................ 113112229

(51) Int. Cl.
*G09G 3/34* (2006.01)
*H04N 23/60* (2023.01)

(52) U.S. Cl.
CPC ........... *G09G 3/3406* (2013.01); *H04N 23/60* (2023.01); *G09G 2320/062* (2013.01)

(58) Field of Classification Search
CPC . G09G 3/3406; G09G 2320/062; H04N 23/60
See application file for complete search history.

(56) References Cited

U.S. PATENT DOCUMENTS

| | | | | |
|---|---|---|---|---|
| 12,368,963 | B1 * | 7/2025 | Dortch | G06V 20/41 |
| 2010/0157139 | A1 * | 6/2010 | Velarde | H04N 23/74<br>348/366 |
| 2023/0379579 | A1 * | 11/2023 | Feng | H04N 23/672 |
| 2025/0254413 | A1 * | 8/2025 | Krishnakumar | H04N 23/73 |

FOREIGN PATENT DOCUMENTS

| | | | |
|---|---|---|---|
| TW | 200945886 | A | 11/2009 |
| TW | 201317947 | A | 5/2013 |
| TW | I857641 | B | 10/2024 |

* cited by examiner

*Primary Examiner* — Kenneth B Lee, Jr.

(74) *Attorney, Agent, or Firm* — CKC & Partners Co., LLC

(57) ABSTRACT

An image processing method includes following operations. An environmental image is captured by a webcam. An automatic photography parameter is calculated according to the environmental image by the webcam. The automatic photography parameter includes an auto white balance parameter, an auto exposure parameter or an auto focus parameter. The automatic photography parameter is transmitted from the webcam to a controller chip of a displayer. A modulation function is performed by the controller chip according to the automatic photography parameter, so as to change a display screen on the displayer.

20 Claims, 9 Drawing Sheets

IMAGE PROCESSING METHOD, IMAGE PROCESSING SYSTEM, AND DISPLAYER

RELATED APPLICATIONS

This application claims the priority benefit of Taiwan Application Serial Number 113112229, filed Mar. 29, 2024, which is herein incorporated by reference.

BACKGROUND

Technical Field

The present disclosure relates to an image processing method and an image processing system, in particular, to a method and a system for performing various modulation functions on a displayer using an automatic photography parameter obtained by a webcam.

Description of Related Art

With the development of science and technology, many electronic devices are equipped with displayers. The displayers may have a variety of built-in modulation functions to modulate some display settings, e.g. brightness, chrominance, blue light filtering, on the displayers. These display settings can be manually adjusted by users to suit personal preferences or specific usage situations (e.g., day, night, low-brightness bedroom, high-brightness exhibition, etc.).

SUMMARY

Some embodiments of the present disclosure relate to an image processing method comprising following operations. An environmental image is captured by a webcam. An automatic photography parameter is calculated according to the environmental image by the webcam. The automatic photography parameter includes an auto white balance parameter, an auto exposure parameter or an auto focus parameter. The automatic photography parameter is transmitted from the webcam to a controller chip of a displayer. A modulation function is performed by the controller chip according to the automatic photography parameter, so as to change a display screen on the displayer.

Some embodiments of the present disclosure relate to an image processing system comprising a webcam and a displayer. The webcam is configured to capture an environmental image. The webcam includes an image processor, which is configured to calculate an automatic photography parameter according to the environmental image. The automatic photography parameter includes at least one of an auto white balance parameter, an auto exposure parameter and an auto focus parameter. The displayer comprises a display panel and a controller chip. The controller chip is coupled to the display panel, is communicatively connected to the image processor, is configured to receive the automatic photography parameter from the image processor of the webcam, performs a modulation function according to the automatic photography parameter and outputs a display screen to the display panel according to a result of the modulation function.

Some embodiments of the present disclosure relate to a displayer comprises a display panel and a controller chip. The controller chip is coupled to the display panel, is communicatively connected to an image processor of a webcam, is configured to receive an automatic photography parameter from the image processor of the webcam, performs a modulation function according to the automatic photography parameter and outputs a display screen to the display panel according to a result of the modulation function.

BRIEF DESCRIPTION OF THE DRAWINGS

To make the above and other objectives, features, advantages, and embodiments of the present disclosure more apparent and understandable, the accompanying drawings are described as follows.

DETAILED DESCRIPTION

The term "coupling" used herein may also refer to "electrical coupling", and the term "connection" may also refer to "electrical connection". "Coupling" and "connection" may also refer to two or more elements cooperating or interacting with each other.

Figures 1, 2:
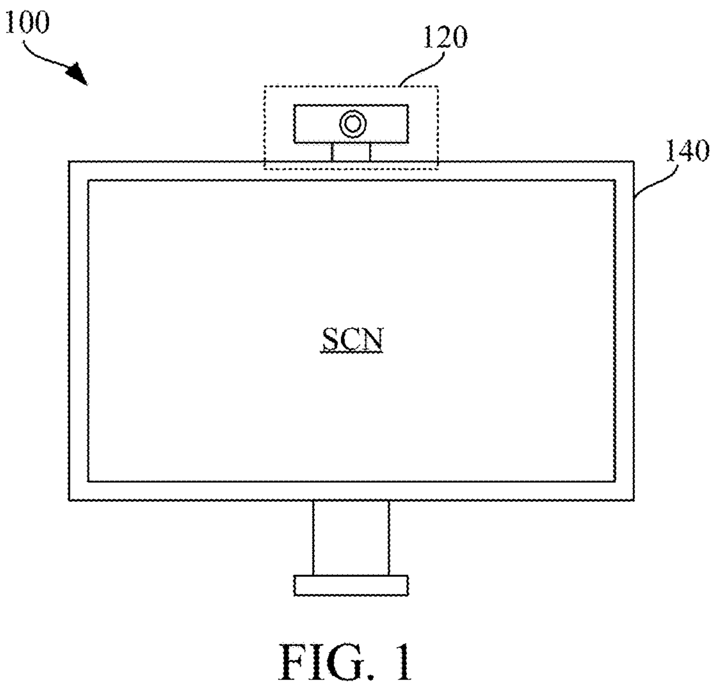
FIG. 1 illustrates a schematic diagram of a display system in some embodiments of the present disclosure.
FIG. 2 illustrates a functional block diagram of the display system in FIG. 1.

Reference is made to FIG. 1, which illustrates a schematic diagram of an image processing system 100 in some embodiments of the present disclosure. The image processing system 100 includes a webcam 120 and a displayer 140.

The displayer 140 is configured to display a corresponding display screen SCN according to an input data signal. In one embodiment, the displayer 140 may have a variety of built-in modulation functions, e.g., brightness modulation (to adjust a brightness of the displayer 140 so that the display screen SCN is bright or dim), contrast modulation (to control a contrast between black and white in the display screen SCN), color temperature modulation (to adjust a color temperature of the display screen SCN, such as a cool tone or warm tone), color calibration (to allow customized color calibration for red, green, blue, etc.), sharpness modulation (to adjust a sharpness of the display screen SCN, so that images are clearer or softer), screen aspect ratio modulation (to change the aspect ratio of the display screen SCN, such as 16:9 or 4:3, to accommodate different contents or needs), blue light filtering (to reduce blue light radiation to help reduce eye fatigue and sleep disruption), etc. Due to these modulation functions, the performance of the displayer 140 can be manually adjusted by users according to their personal preferences or specific usage scenarios.

In some examples, in order for the displayer to automatically perform the modulation functions as the surrounding environment changes, a built-in optical sensor or proximity sensor needs to be additionally buried in the displayer to sense the state of the surrounding environment of the displayer, and to automatically control the various built-in modulation functions of the displayer based on sensing results. In these examples, the displayer needs additional spaces and costs to bury the optical sensor or proximity sensor, and users may accidentally block an optical sensing chip, causing the failure of the automatic modulation functions or incorrect modulation.

With the popularization of remote work and video conferences, the webcam 120 will be used in many application scenarios, and the webcam 120 is used to record or capture real-time streaming images for users to interact with others.

In the embodiment shown in FIG. 1, the webcam 120 is disposed on the displayer 140, i.e., the webcam 120 and the displayer 140 are adjacent to each other, so that an image captured by the webcam 120 can reflect a surrounding environment state (e.g., a surrounding brightness, a distance from a person in front, and a color temperature of the surrounding environment, etc.) of a usage scenario of the displayer 140. Reference is also made to FIG. 2 which illustrates a functional block diagram of the image processing system 100 in FIG. 1. As shown in FIG. 2, the webcam 120 includes a lens module 122, an image sensor 124, and an image processor 126.

In practical applications, the lens module 122 may include an optical lens, a focusing structure corresponding to the optical lens, an aperture, and an aperture modulation structure, which are well known to those skilled in the art and are not described in detail here. The image sensor 124 may include a complementary metal-oxide semiconductor (CMOS) photosensitive element or a charge-coupled device (CCD) photosensitive element or the like. The image processor 126 may be an image signal processor (ISP), or a microcontroller (MCU) with an image processing function.

Figure 3:
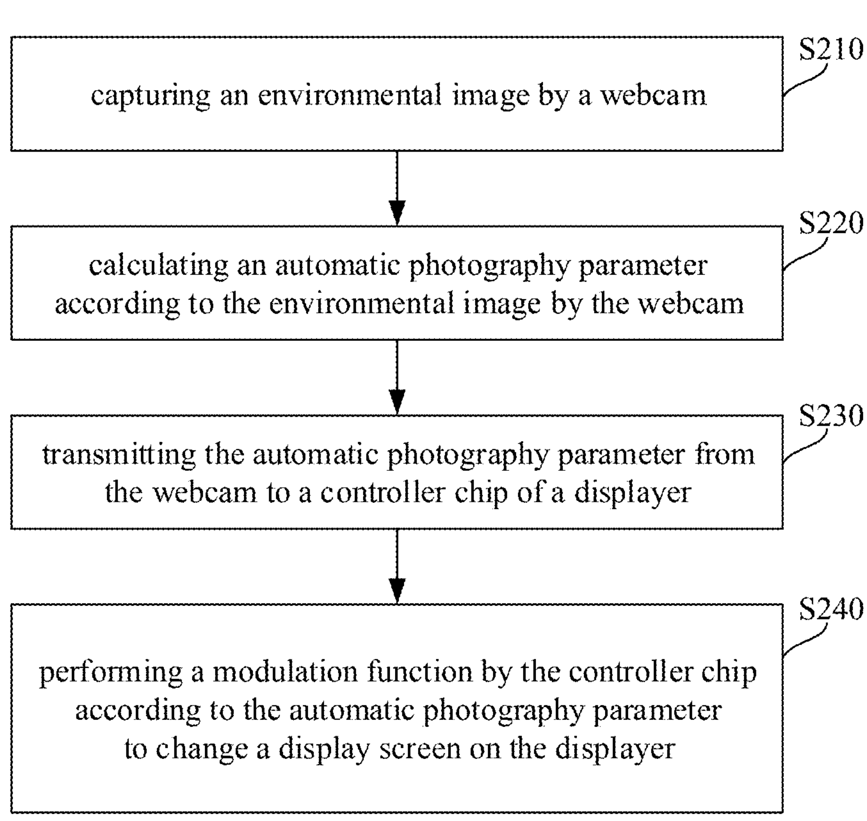
FIG. 3 illustrates a method flowchart of an image processing method in some embodiments of the present disclosure.

Reference is also made to FIG. 3, which illustrates a method flowchart of an image processing method 200 in some embodiments of the present disclosure. In some embodiments, the image processing method 200 shown in FIG. 3 may be performed by the image processing system 100 shown in FIG. 1 and FIG. 2.

As shown in FIG. 3, in step S210 of the image processing method 200, the webcam 120 is configured to capture an environmental image IMG. Further, as shown in FIG. 2, environmental light around the webcam 120 is transmitted through the lens module 122 to the image sensor 124, and the image sensor 124 is configured to sense the environmental light and capture the environmental image IMG, and transmit the environmental image IMG to the image processor 126.

As shown in FIGS. 2 and 3, the image processing method 200 proceeds to step S220. In step S220, the image processor 126 of the webcam 120 is configured to calculate an automatic photography parameter PA according to the environmental image IMG. The automatic photography parameter PA includes at least one of an auto white balance parameter $P_{AWB}$, an auto exposure parameter $P_{AE}$, and an auto focus parameter $P_{AF}$.

In one embodiment, the image processor 126 is able to perform an auto white balance algorithm, an auto exposure algorithm, and an auto focus algorithm according to the environmental image IMG, and these three algorithms are collectively referred to as "3A algorithms". The auto white balance parameter $P_{AWB}$, the auto exposure parameter $P_{AE}$ and the auto focus parameter $P_{AF}$ can be obtained respectively based on these 3A algorithms. For example, the auto focus algorithm can be a contrast detection auto focus (CDAF) algorithm, a phase detection auto focus (PDAF) algorithm, or other similar focus algorithms. For example, the auto exposure algorithm can be a high-dynamic-range histogram (HDH) auto exposure algorithm, a median auto exposure algorithm, or other similar exposure algorithms. For example, the auto white balance algorithm can be a gray-world algorithm or other similar white balance algorithms.

In one embodiment, based on the auto exposure parameter $P_{AE}$, the image processor 126 can perform a feedback control to adjust an aperture size of the lens module 122 and adjust on a signal gain of the image sensor 124. Based on the auto focus parameter $P_{AF}$, the image processor 126 can perform a feedback control to adjust a focal distance of the lens module 122. Additionally, based on the auto white balance parameter $P_{AWB}$, the image processor 126 may modulate an auto white balance origin (i.e., correcting a color temperature of the environmental image IMG) of the environmental image IMG, such that a white region in the environmental image IMG appears to be vivid and neutral.

As shown in FIG. 3, the image processing method 200 proceeds to step S230. In step S230, the webcam 120 is configured to transmit the automatic photography parameter PA to a controller chip 142 of the displayer 140. In the embodiment shown in FIG. 2, the image processor 126 is able to transmit the obtained automatic photography parameter PA (including at least one of the auto white balance parameter $P_{AWB}$, the auto exposure parameter $P_{AE}$ and the auto focus parameter $P_{AF}$) to the displayer 140 via a transmission interface 128.

On the other hand, the displayer 140 includes a controller chip 142, a display panel 144, and a transmission interface 148. The controller chip 142 of the displayer 140 receives the automatic photography parameter PA from the image processor 126 via the transmission interface 148.

In one embodiment, the webcam 120 can be an external webcam mounted outside the displayer 140; the transmission interface 128 and the transmission interface 148 each can be a universal serial bus (USB), a high-definition multimedia interface (HDMI), a display port, or a network transmission interface (e.g., Bluetooth, WiFi, etc.); and the image processor 126 of the webcam 120 transmits the automatic photography parameters PA to the controller chip 142 of the displayer 140 via the transmission interface between the devices.

In another embodiment, the webcam 120 can also be a built-in webcam built in the displayer 140, the transmission interface 128 and the transmission interface 148 each can be an inter-integrated circuit ($I^2C$) or a serial peripheral interface bus (SPI), and the image processor 126 transmits the automatic photography parameters PA to the controller chip 142 via a transmission bus between different integrated circuits within the device.

As shown in FIG. 2 and FIG. 3, the image processing method 200 proceeds to step S240. In step S240, the controller chip 142 is able to perform a modulation function according to the automatic photography parameter PA, so as to change a display screen SCN on the displayer 140. In practical applications, based on various information provided by the automatic photography parameters PA, the controller chip 142 can automatically trigger different modulation functions of the displayer 140, so as to produce display screens SCNs with respective effects for different application scenarios. The automatic photography parameters PA and corresponding modulation functions performed by the controller chip 142 will be further explained in subsequent embodiments.

Figure 4:
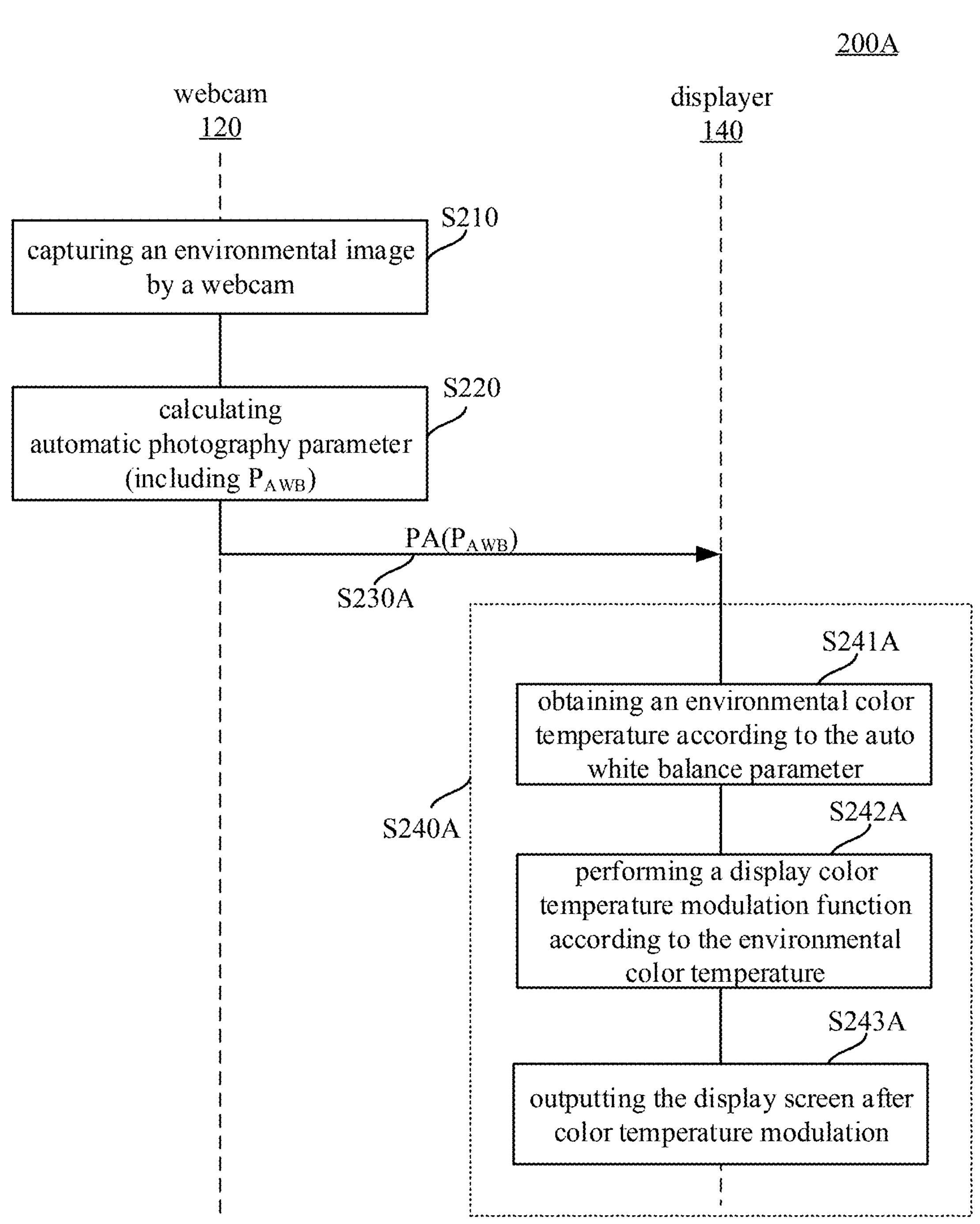
FIG. 4 illustrates a schematic diagram of performing a color temperature modulation function according to an auto white balance parameter in an automatic photography parameter in an image processing method in some embodiments of the present disclosure.

Reference is made to FIG. 4 that illustrates a schematic diagram of performing a color temperature modulation function according to the auto white balance parameter $P_{AWB}$ in the automatic photography parameter PA in an image processing method 200A in some embodiments of the present disclosure. The image processing method 200A shown in FIG. 4 is application demonstrational example of the image processing method 200 shown in FIG. 3.

As shown in FIG. 2 and FIG. 4, the automatic photography parameter PA, calculated in step S220 by the image processor 126 of the webcam 120 according to the environmental image IMG, includes the auto white balance parameter $P_{AWB}$ in this example. In step S230A, the webcam 120 transmits the auto white balance parameter $P_{AWB}$ to the controller chip 142 of the displayer 140.

As shown in FIGS. 2 and 4, the controller chip 142 of the displayer 140 performs step S240A. In step S240A, the controller chip 142 performs the modulation function according to the automatic photography parameter PA, so as to change the display screen SCN of the displayer 140. In the present embodiment, step S240A includes steps S241A, S242A, and S243A.

First, at step S241A, the controller chip 142 of the displayer 140 obtains an environmental color temperature according to the auto white balance parameter $P_{AWB}$ received from the webcam 120. Since the environmental image IMG captured by the webcam 120 reflects the light color temperature properties of the surrounding environment at the time, e.g., warm tones, cool tones, green-tinted tones, and red-tinted tones, the controller chip 142 can determine the environmental color temperature of the surrounding environment at this moment according to the auto white balance parameter $P_{AWB}$. At step S242A, the controller chip 142 performs a display color temperature modulation function of the display panel 140 according to the environmental color temperature determined by the auto white balance parameter $P_{AWB}$, so that a display color temperature of the display screen SCN is modulated to approach the environmental color temperature. For example, when the environmental color temperature determined by the auto white balance parameter $P_{AWB}$ is 6700K (cold color, blue-tinted color), an average value of the display color temperature of the display screen SCN modulated by the controller chip 142 is adjusted to approach 6700K. For example, when the environmental color temperature determined by the auto white balance parameter $P_{AWB}$ is 2500K (warm color, yellow-tinted color), an average value of the display color temperature of the display screen SCN modulated by the controller chip 142 is adjusted to approach 2500K. At step S243A, the controller chip 142 outputs the display screen SCN (after color temperature modulation) to the display panel 144 for displaying.

Figure 5:
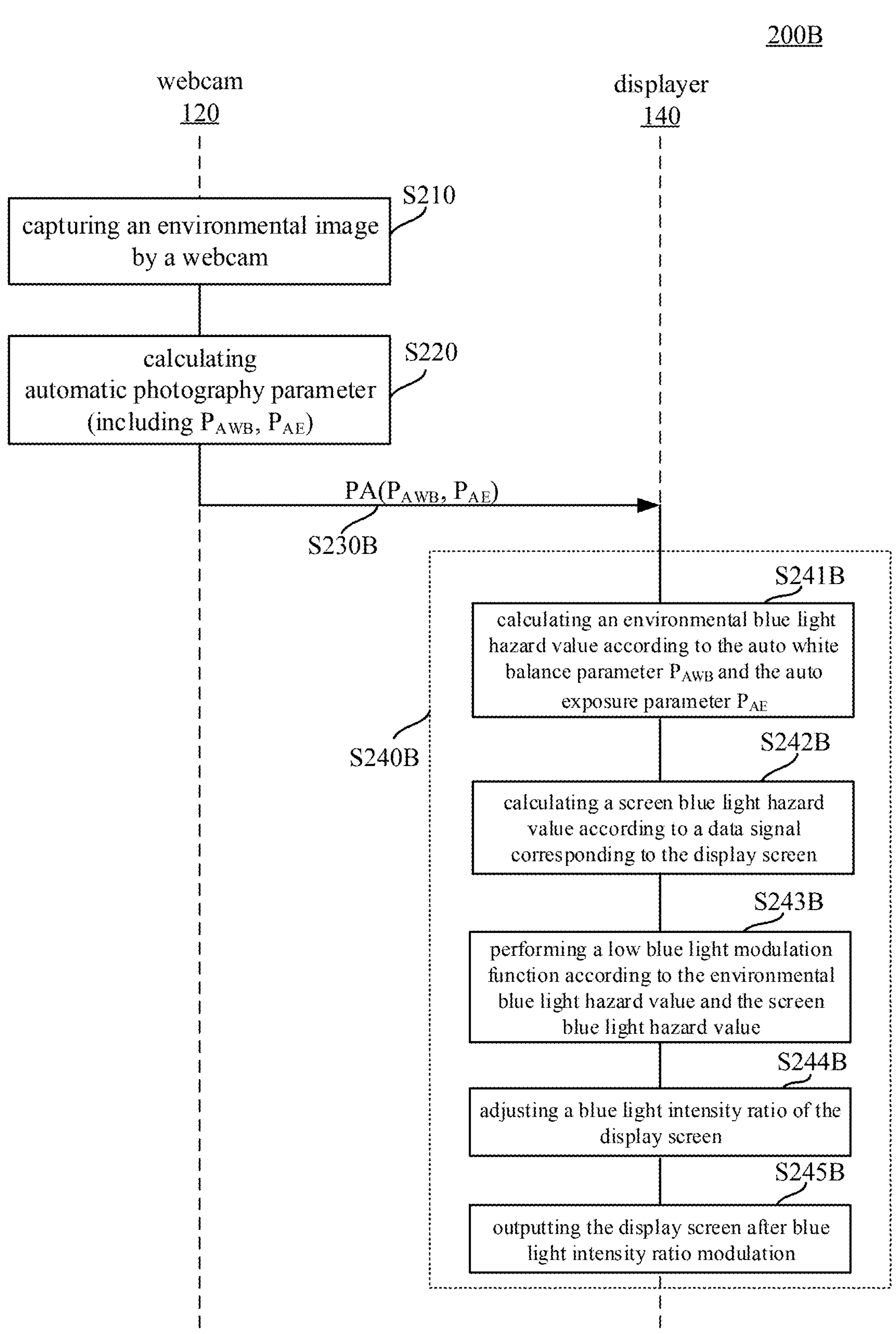
FIG. 5 illustrates a schematic diagram of performing a blue light modulation function according to the auto white balance parameter in the automatic photography parameter in an image processing method in some embodiments of the present disclosure.

Reference is made to FIG. 5 that illustrates a schematic diagram of performing a blue light modulation function according to the auto white balance parameter $P_{AWB}$ in the automatic photography parameter PA in an image processing method 200B in some embodiments of the present disclosure. The image processing method 200B shown in FIG. 5 is another demonstrational example of the image processing method 200 shown in FIG. 3.

As shown in FIG. 2 and FIG. 5, at step S220, the automatic photography parameter PA calculated by the image processor 126 of the webcam 120 according to the environmental image IMG includes, for example, the auto white balance parameter $P_{AWB}$ and the auto exposure parameter $P_{AE}$. At step S230B, the webcam 120 transmits the automatic photography parameter PA to the controller chip 142 of the displayer 140. As shown in FIG. 2 and FIG. 5, the controller chip 142 of the displayer 140 performs step S240B. In step S240B, the controller chip 142 performs a modulation function according to the automatic photography parameter PA, so as to change the display screen SCN of the displayer 140. In the present embodiment, step S240B includes steps S241B-S245B.

First, at step S241B, the controller chip 142 of the displayer 140 calculates an environmental blue light hazard value according to the auto white balance parameter $P_{AWB}$ and the auto exposure parameter $P_{AE}$ from the webcam 120. Since the environmental image IMG captured by the webcam 120 reflects the light color temperature properties of the surrounding environment at the time, e.g., warm tones, cool tones, green-tinted tones, and red-tinted tones, the controller chip 142 may analyze the auto white balance parameter $P_{AWB}$ to obtain ratios of a blue light intensity, a red light intensity and a green light intensity within an auto white balance origin (i.e., white point) of the surrounding environment at this moment.

In one embodiment, the environmental blue light hazard value EB can be obtained according to the following Formula (1):

$$EB = \frac{\text{blue light intensity}}{\text{blue light intensity} + \text{red light intensity} + \text{green light intensity}} \quad \text{Formula (1)}$$

The higher the proportion of the blue light intensity in the auto white balance origin is, the larger the environmental blue light hazard value EB is. On the other hand, the lower the proportion of the blue light intensity in the auto white balance origin is, the smaller the environmental blue light hazard value EB is.

Alternatively, in another embodiment, at step S241B, the controller chip 142 calculates the environmental blue light hazard value EB according to the auto white balance parameter $P_{AWB}$ and the auto exposure parameter $P_{AE}$ from the webcam 120. The environmental blue light hazard value EB can be obtained according to the following Formula (2):

$$EB = \frac{\frac{Av(B)}{255} \times \sum_{peak-20}^{peak+20} E_B(\lambda)}{\frac{Av(R)}{255} \times \sum_{380}^{780} E_R(\lambda) + \frac{Av(G)}{255} \times \sum_{380}^{780} E_H(\lambda) + \frac{Av(B)}{255} \times \sum_{380}^{780} E_B(\lambda)} \quad \text{Formula (2)}$$

where Av(R) is the red light intensity, Av(G) is the green light intensity, Av(B) is the blue light intensity, $$\sum_{peak-20}^{peak+20} E_B(\lambda)$$

is a sum of energy between the plus and minus 20 nm wavelengths of a blue light peak, $$\sum_{380}^{780} E_R(\lambda)$$

is a sum of red light energy, $$\sum_{380}^{780} E_G(\lambda)$$

is a sum of green light energy, and $$\sum_{380}^{780} E_B(\lambda)$$

is a sum of blue light energy. In the embodiment where the environmental blue light hazard value EB is calculated using the above Formula (2), the spectral distributions (i.e., numerical values such as $$\sum_{peak-20}^{peak+20} E_B(\lambda), \sum_{380}^{780} E_R(\lambda), \sum\sum_{380}^{780} E_G(\lambda), \sum_{380}^{780} E_B(\lambda))$$

) of an environmental light source and the brightness (e.g., intensities such as Av(R), Av(G) and Av(B)) of the environmental light source will need to be known. In some examples, the controller chip 142 can determine the spectrum distribution of the environmental light source according to the auto white balance parameter $P_{AWB}$, and the controller chip 142 can determine the brightness of the environmental light source according to the auto exposure parameter $P_{AE}$.

In other examples, the auto exposure parameter $P_{AE}$ generated by the webcam 120 can provide accurate brightness information, but the webcam 120 may be difficult to measure the spectral distribution accurately (i.e., the spectral distribution with a sufficient accuracy is difficult to obtain from the auto white balance parameter $P_{AWB}$). In this case, the information of the spectral distribution can be collected by performing offline experiments, and the brightness of the environmental light source is determined based on the auto exposure parameter $P_{AE}$ and looked up in a lookup table to calculate the current environmental blue light hazard value EB. For example, in environments with LED light sources, fluorescent tube light sources or other light sources, an instrument such as a spectrophotometer or a spectroradiometer that can measure the light spectrum can be set up to measure the spectral distribution and the brightness, so as to obtain spectrums under different lamp sources and different brightness configurations; then the spectrums can be brought into the Formula (2) to obtain the environmental blue ray hazard value EB; and the offline collected data is recorded in the lookup table, and the lookup table can be written into a memory (not shown) in the controller chip 142 or a memory unit (not shown) coupled to the controller chip 142.

In some practical applications, the controller chip 142 may refer to the lookup table according to the brightness determined by the auto exposure parameter $P_{AE}$, so as to determine the closest environmental blue light hazard value EB of the current environment.

At step S242B, the controller chip 142 of the displayer 140 calculates a screen blue light hazard value according to a data signal corresponding to the display screen SCN. The data signal records a blue grayscale brightness, a red grayscale brightness and a green grayscale brightness of a plurality of pixels in the display screen SCN. In one embodiment, the screen blue light hazard value DB can be obtained according to the following Formula (3):

DB $$DB = \frac{\text{blue grayscale brightness}}{\text{blue grayscale brightness} + \text{red grayscale brightness} + \text{green grayscale brightness}} \quad \text{Formula (3)}$$

At step S243B, the controller chip 142 performs a low blue light modulation function according to the environmental blue light hazard value and the screen blue light hazard value. For example, when a sum of the environmental blue light hazard value and the screen blue light hazard value is greater than a threshold value, the controller chip 142 performs the low blue light modulation function. For example, when the sum of the environmental blue light hazard value and the screen blue light hazard value is less than the threshold value, the controller chip 142 does not perform the low blue light modulation function.

For example, when the controller chip 142 determines that the low blue light modulation function needs to be performed, at step S244B, the controller chip 142 can increase a blue light gain value, or decrease a red light gain value or a green light gain value. The controller chip 142 multiplies the increased blue light gain value (or the decreased red light gain value or green light gain value) by the data signal corresponding to the display screen SCN, and adjusts a blue light intensity ratio of the display screen SCN based on the modulated blue light gain value (or the red light gain value or green light gain value).

At step S245B, the controller chip 142 outputs the display screen SCN after blue light intensity ratio modulation to the display panel 144.

On the other hand, when the controller chip 142 determines that the low blue light modulation function needs not to be performed (the sum of the environmental blue light hazard value and the screen blue light hazard value does not reach the threshold value), at step S244B, the controller chip 142 does not modulate the blue light gain value, the red light gain value or the green light gain value. The controller chip 142 does not change the blue light intensity ratio of the display screen SCN.

Figure 6:
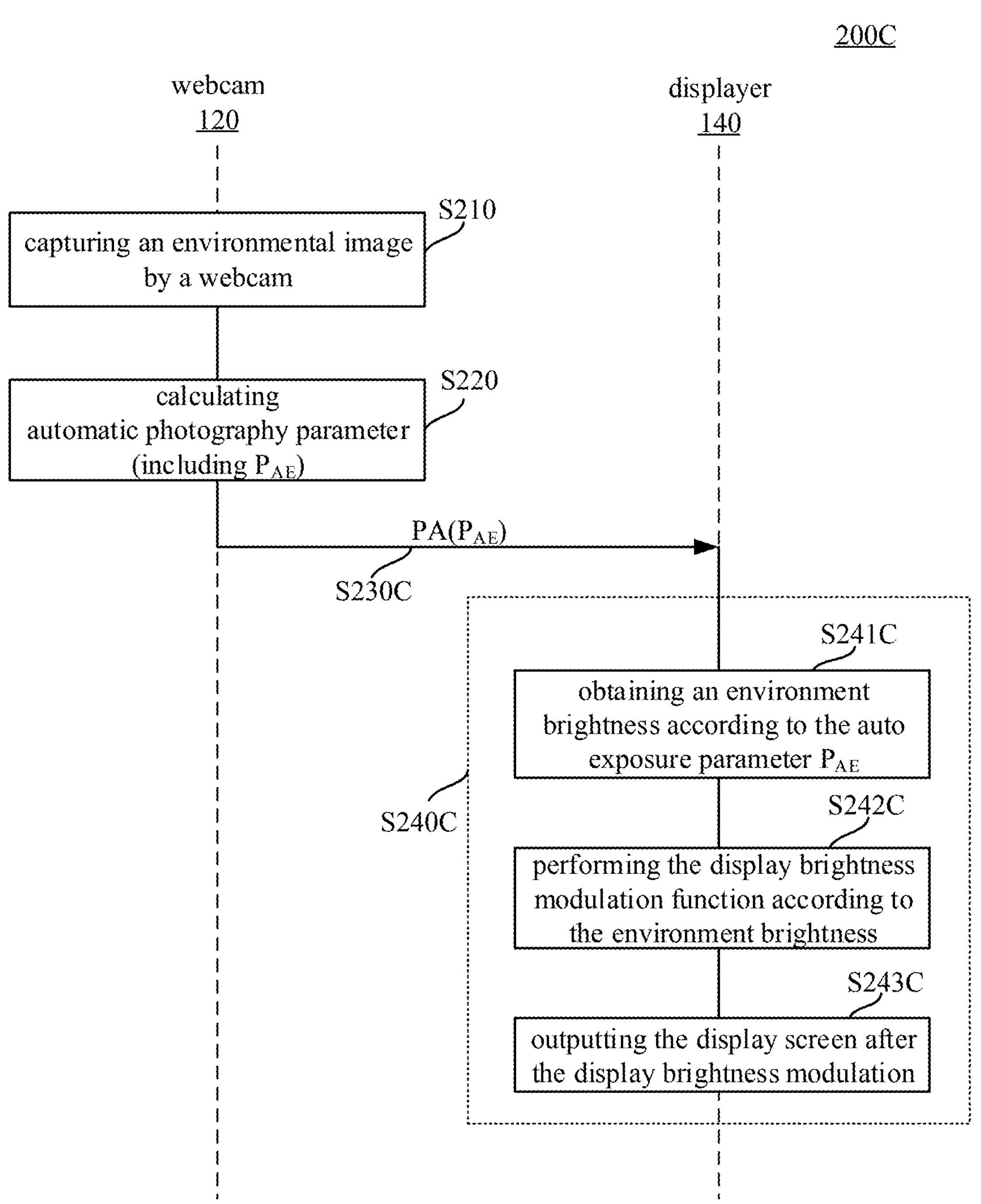
FIG. 6 illustrates a schematic diagram of performing a display brightness modulation function according to an auto exposure parameter in the automatic photography parameter in an image processing method in some embodiments of the present disclosure.

Reference is made to FIG. 6 which illustrates a schematic diagram of performing a display brightness modulation function according to the auto exposure parameter $P_{AE}$ in the automatic photography parameter PA in an image processing method 200C in some embodiments of the present disclosure. The image processing method 200C shown in FIG. 6 is one specific application example of the image processing method 200 shown in FIG. 3.

As shown in FIGS. 2 and 6, at step S220, the automatic photography parameter PA calculated by the image processor 126 of the webcam 120 according to the environmental image IMG includes the auto exposure parameter $P_{AE}$. At step S230C, the webcam 120 transmits the auto exposure parameter $P_{AE}$ to the controller chip 142 of the displayer 140. As shown in FIG. 2 and FIG. 6, the controller chip 142 of the displayer 140 performs step S240C at which the modulation function is performed according to the automatic photography parameter PA, so as to change the display screen SCN of the displayer 140. In the present embodiment, step S240C includes steps S241C-S243C.

First, at step S241C, the controller chip 142 of the displayer 140 obtains an environment brightness according to the auto exposure parameter $P_{AE}$ from the webcam 120. Since the environmental image IMG captured by the webcam 120 reflects the light brightness of the surrounding environment at the time, the controller chip 142 can determine the environment brightness of the surrounding environment according to the auto exposure parameter $P_{AE}$.

At step S242C, the controller chip 142 of the displayer 140 performs the display brightness modulation function according to the environment brightness, so that the display brightness of the modulated display screen SCN is positively correlated with the environment brightness. For example, when the environment brightness is a high brightness, the controller chip 142 increases the display brightness of the display screen SCN; and when the environment brightness is a low brightness, the controller chip 142 decreases the display brightness of the display screen SCN. The controller chip 142 is configured to control the display brightness of the display screen SCN to change with the environment brightness.

At step S243C, the controller chip 142 outputs the display screen SCN after the display brightness modulation to the display panel 144.

In this way, when the surrounding brightness is high (e.g., there is strong lighting or it is used outdoors), the display brightness of the display screen SCN can be increased to avoid that users cannot see the display screen SCN on the display panel 144 due to surrounding light reflection. In another aspect, when the surrounding brightness is low (e.g., during late night hours or in low-brightness indoor environments), the display brightness of the display screen SCN can be correspondingly reduced to avoid light pollution or excessive stimulation of user's eyes caused by that the display panel 144 is too bright.

Figure 7:
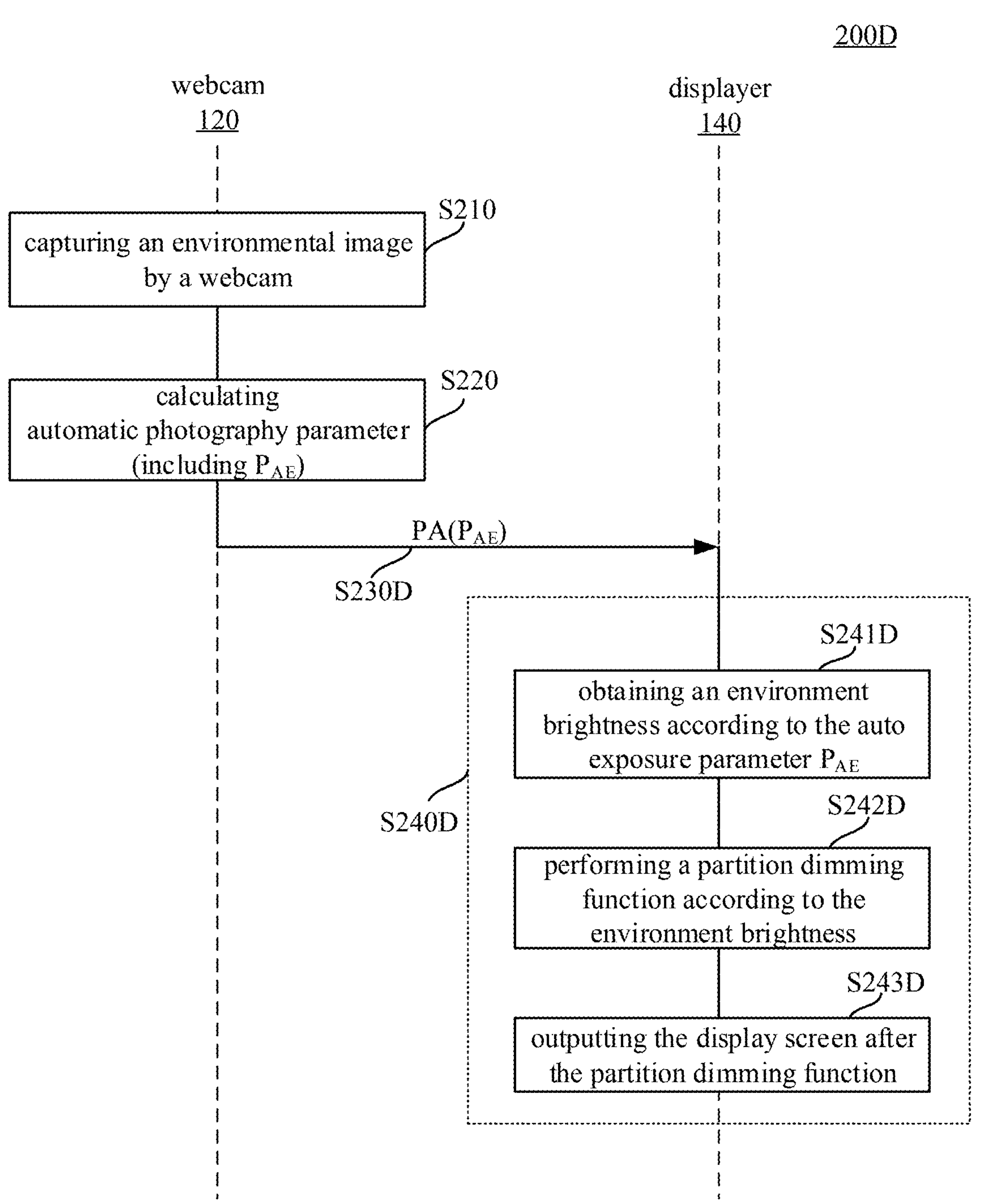
FIG. 7 illustrates a schematic diagram of performing a partition dimming function according to the auto exposure parameter in the automatic photography parameter in an image processing method in some embodiments of the present disclosure.

Reference is made to FIG. 7 which illustrates a schematic diagram of performing a partition dimming modulation function according to the auto exposure parameter $P_{AE}$ in the automatic photography parameter PA in an image processing method 200D in some embodiments of the present disclosure. The image processing method 200D shown in FIG. 7 is one specific application example of the image processing method 200 shown in FIG. 3.

As shown in FIGS. 2 and 7, at step S220, the automatic photography parameter PA calculated by the image processor 126 of the webcam 120 according to the environmental image IMG includes the auto exposure parameter $P_{AE}$. At step S230D, the webcam 120 transmits the auto exposure parameter $P_{AE}$ to the controller chip 142 of the displayer 140. As shown in FIGS. 2 and 7, the controller chip 142 of the displayer 140 performs step S240D at which the modulation function is performed according to the automatic photography parameter PA, so as to change the display screen SCN of the displayer 140. In the present embodiment, step S240D includes steps S241D-S243D.

First, at step S241D, the controller chip 142 of the displayer 140 obtains an environment brightness according to the auto exposure parameter $P_{AE}$ from the webcam 120.

At step S242D, the controller chip 142 of the displayer 140 performs a partition dimming function according to the environment brightness, so that a maximum block brightness of a plurality of display blocks of the modulated display screen SCN is positively correlated with the environment brightness. In the partition dimming function, the display panel 144 can be partitioned into a plurality of dimming blocks, e.g., the display panel 144 is partitioned into 16*16 blocks, i.e., 256 dimming blocks, and the controller chip 142 can set respective block gain for each dimming block, thereby affecting the brightness of each dimming block.

For example, it is assumed that the grayscale brightness is 0-255, 0 is the lowest brightness and 255 is the highest brightness. When the environment brightness is a high brightness, the controller chip 142 can set the maximum block brightness to 255, at this moment, the pixel brightness of each dimming block can vary from 0 to 255, and different block gains can be further applied among individual dimming blocks. When the environment brightness is a medium brightness, the controller chip 142 can set the maximum block brightness to 180, at this moment, the pixel brightness of each dimming block can vary from 0 to 180, and different block gains can be further applied among individual dimming blocks. When the environment brightness is a low brightness, the controller chip 142 can set the maximum block brightness to 100, at this moment, the pixel brightness of each dimming block can vary from 0 to 100, and different block gains can be further applied among individual dimming blocks. In other words, as the environmental light changes, the controller chip 142 applies suitable partition dimming effects. At step S243D, the controller chip 142 outputs the display screen SCN after the partition dimming function.

Figure 8:
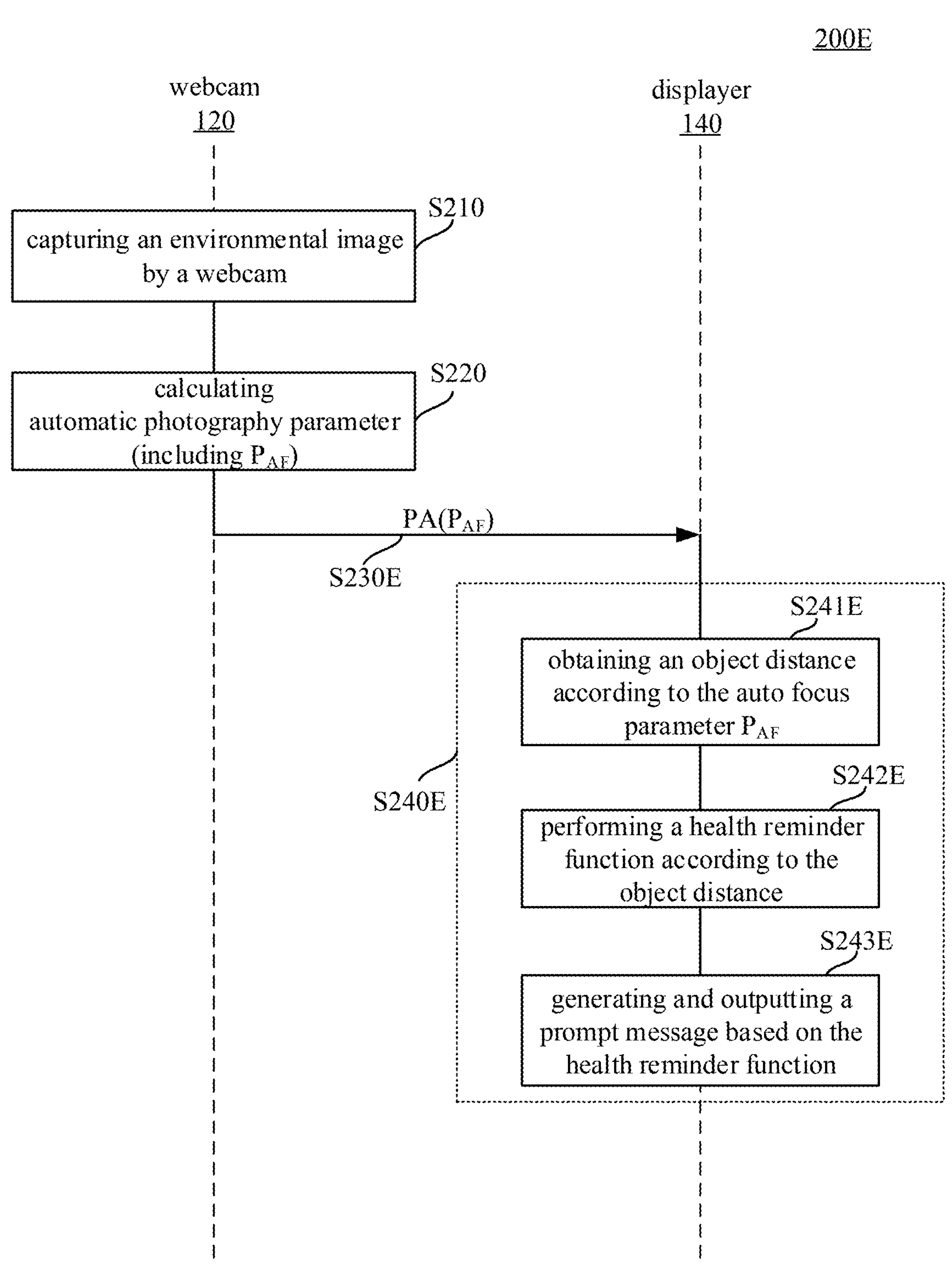
FIG. 8 illustrates a schematic diagram of performing a health reminder function according to an auto focus parameter in the automatic photography parameter in an image processing method in some embodiments of the present disclosure.

Reference is made to FIG. 8 which illustrates a schematic diagram of performing a health reminder function according to the auto focus parameter $P_{AF}$ in the automatic photography parameter PA in an image processing method 200E in some embodiments of the present disclosure. The image processing method 200E shown in FIG. 8 is one specific application example of the image processing method 200 shown in FIG. 3.

As shown in FIGS. 2 and 8, at step S220, the automatic photography parameter PA calculated by the image processor 126 of the webcam 120 according to the environmental image IMG includes the auto focus parameter $P_{AF}$. At step S230E, the webcam 120 transmits the auto focus parameter $P_{AF}$ to the controller chip 142 of the displayer 140. As shown in FIGS. 2 and 8, the controller chip 142 of the displayer 140 performs step S240E at which the modulation function is performed according to the automatic photography parameter PA, so as to change the display screen SCN of the displayer 140. In the present embodiment, step S240E includes steps S241E-S243E.

First, at step S241E, the controller chip 142 of the displayer 140 obtains an object distance according to the auto focus parameter $P_{AF}$ from the webcam 120. Assuming that a user is in front of the webcam 120, a foreground object in the environmental image IMG captured by the webcam 120 may be the user's portrait, at this moment, a focal distance corresponding to the auto focus parameters $P_{AF}$ may correspond to the object distance (i.e., a distance between the user and the webcam 120). The controller chip 142 can obtain the object distance according to the auto focus parameters $P_{AF}$ (the focal distance therein).

At step S242E, the controller chip 142 performs the health reminder function according to the object distance. At step S243E, the controller chip 142 generates a prompt message based on the health reminder function and outputs the prompt message.

In one embodiment, when it is determined that the object distance is less than a threshold value (e.g., less than 50 cm), the controller chip 142, based on the health reminder function, generates a prompt signal such as a text window reminder "it is recommended to adjust your sitting position or maintain an appropriate distance from the screen" displayed on the display panel 144. In another embodiment, the prompt signal generated by the controller chip 142 may further include an audible reminder such as an alarm sound emitted by a speaker on the displayer 140, or playing a reminder sound message.

In another embodiment, when it is determined that the object distance remains unchanged and the duration exceeds a threshold time (for example, more than 30 minutes), the controller chip 142 may also, based on the health reminder function, generate the prompt signal such as a text window reminder "it is recommended to change the sitting position or temporarily leave the seat" displayed on the display panel 144.

Figure 9:
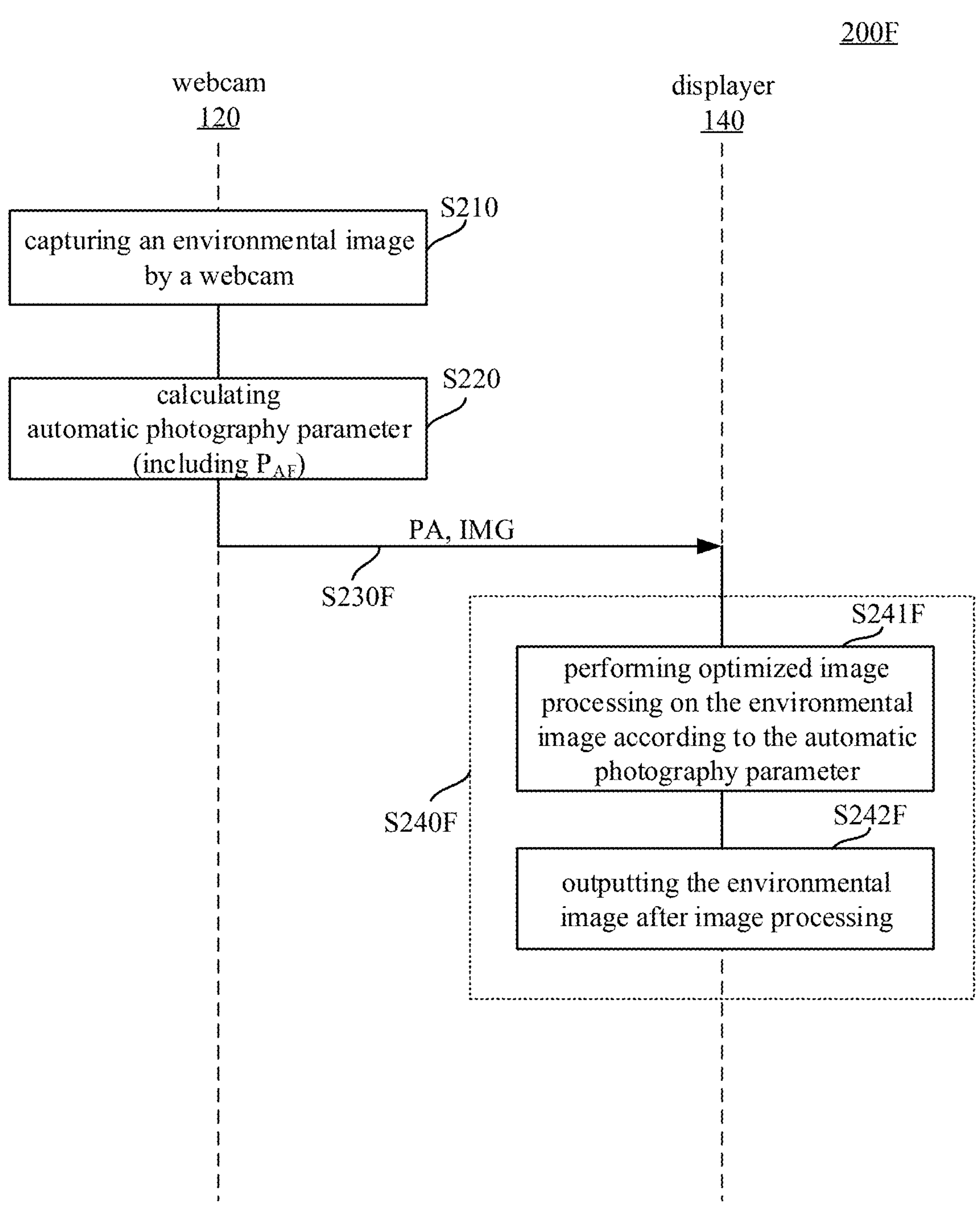
FIG. 9 illustrates a schematic diagram of performing an image processing function according to the automatic photography parameter in an image processing method in some embodiments of the present disclosure.

Reference is made to FIG. 9 which illustrates a schematic diagram of performing an image processing function according to the automatic photography parameter PA in an image processing method 200F in some embodiments of the present disclosure. The image processing method 200F shown in FIG. 9 is one specific application example of the image processing method 200 shown in FIG. 3.

As shown in FIGS. 2 and 9, at step S220, the automatic photography parameter PA calculated by the image processor 126 of the webcam 120 according to the environmental image IMG includes at least one of the auto white balance parameter $P_{AWB}$, the auto exposure parameter $P_{AE}$ and the auto focus parameter $P_{AF}$. At step S230F, the webcam 120 transmits the automatic photography parameters PA together with the captured environmental image IMG to the controller chip 142 of the displayer 140. As shown in FIGS. 2 and 9, the controller chip 142 of the displayer 140 performs step S240F at which the modulation function is performed according to the automatic photography parameter PA, so as to change the display screen SCN of the displayer 140. In the present embodiment, step S240F includes steps S241F-S242F.

First, at step S241F, the controller chip 142 can further perform optimized image processing on the environmental image IMG according to the automatic photography parameter PA. The automatic photography parameters PA include at least one of the auto white balance parameter $P_{AWB}$, the auto exposure parameter $P_{AE}$, and the auto focus parameter $P_{AF}$. The auto white balance parameter $P_{AWB}$, the auto exposure parameter $P_{AE}$, and the auto focus parameter $P_{AF}$ can represent information such as color temperature, brightness, and object distance of the environmental image IMG. At step S242F, the environmental image IMG after image processing by the controller chip 142 is used as the display screen SCN (or the environmental image IMG after image processing is embedded into the display screen SCN and used as a part of the display screen SCN), and output to the display panel 144.

For example, the controller chip 142 can further modulate the color temperature of the environmental image IMG according to panel properties (the color temperature of a panel is cool or warm) of the display panel 144, compensate for the color temperature of the environmental image IMG, and generate the compensated display screen SCN. Alternatively, the controller chip 142 can further modulate the average brightness of the environmental image IMG according to the original panel brightness of the display panel 144, compensate for the brightness of the environmental image IMG, and generate the compensated display screen SCN.

Figure 10:
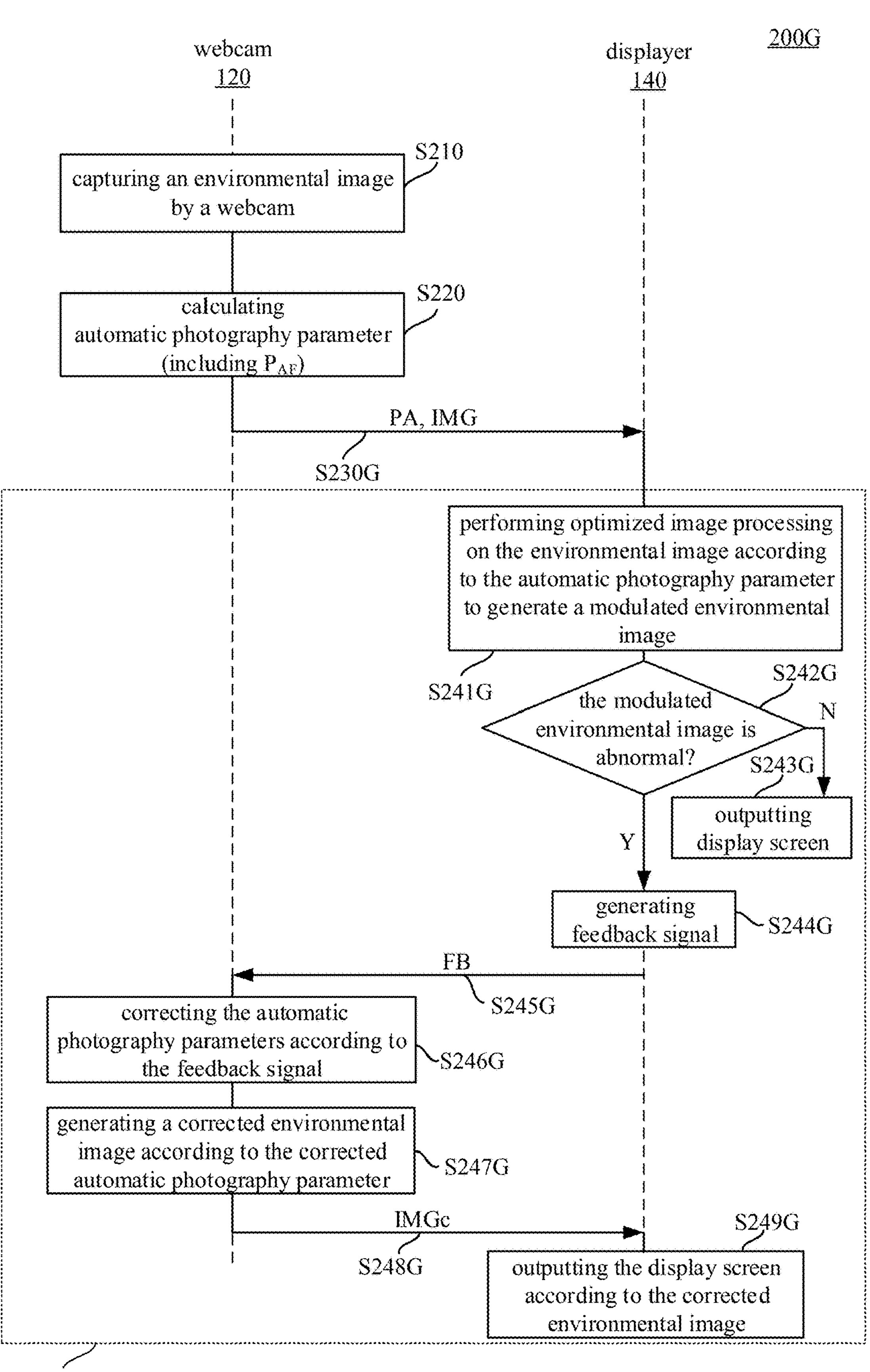
FIG. 10 illustrates a schematic diagram of performing a feedback function according to the automatic photography parameter in an image processing method in some embodiments of the present disclosure.

Reference is made to FIG. 10 which illustrates a schematic diagram of performing a feedback function according to the automatic photography parameter PA in an image processing method 200G in some embodiments of the present disclosure. The image processing method 200G shown in FIG. 10 is one specific application example of the image processing method 200 shown in FIG. 3.

As shown in FIGS. 2 and 10, at step S220, the automatic photography parameter PA calculated by the image processor 126 of the webcam 120 according to the environmental image IMG includes at least one of the auto white balance parameter $P_{AWB}$, the auto exposure parameter $P_{AE}$ and the auto focus parameter $P_{AF}$. At step S230G, the webcam 120 transmits the automatic photography parameters PA together with the captured environmental image IMG to the controller chip 142 of the displayer 140. As shown in FIGS. 2 and 10, the controller chip 142 of the displayer 140 performs step S240G at which the modulation function is performed according to the automatic photography parameter PA, so as to change the display screen SCN of the displayer 140. In the present embodiment, step S240G includes steps S241G-S249G.

First, at step S241G, the controller chip 142 can further perform optimized image processing on the environmental image IMG according to the automatic photography parameter PA to generate a modulated environmental image. The auto white balance parameter $P_{AWB}$, the auto exposure parameter $P_{AE}$, and the auto focus parameter $P_{AF}$ can represent information such as color temperature, brightness, and object distance of the environmental image IMG. At step S242G, the controller chip 142 determines whether the modulated environmental image is abnormal.

In one embodiment, whether the modulated environmental image is abnormal can be decided based on whether the modulated environmental image has an overexposure abnormality. For example, when the pixel brightness of the modulated environmental image has exceeded the maximum brightness of the displayer 140, or the modulated environmental image has a large area of pixels (for example, more than 30% of the pixels) whose pixel brightness is the maximum brightness of the displayer 140, it can be determined that the modulated environmental image has an overexposure abnormality.

In one embodiment, whether the modulated environmental image is abnormal can be decided based on whether the modulated environmental image has an out-of-focus abnormality. For example, the controller chip 142 is configured to perform spectral analysis on the modulated environmental image. When it is found that through spectral analysis, pixel contents are concentrated in low-frequency components and high-frequency components lack, it is likely that the modulated environmental image has an out-of-focus abnormality (i.e., the modulated environmental image is not correctly focused on the foreground object). In addition, the modulated environmental image may also have a problem of insufficient sharpness. In this case, it can be determined that the modulated environmental image has the out-of-focus abnormality.

In another embodiment, whether the modulated environmental image is abnormal can be decided based on whether there is a color temperature beyond a reasonable range in the modulated environmental image. When it is found that the color temperature exceeds the reasonable range, it can be determined that there is an abnormal situation (e.g., white balance misalignment) in the modulated environmental image.

When no abnormality is found, step S243G will be performed, at which the controller chip 142 uses the modulated environmental image after image processing by the controller chip 142 as the display screen SCN (embedded in the display screen SCN) and outputs it to the display panel 144.

When an abnormality is detected, step S244G is performed, at which the controller chip 142 generates a feedback signal FB according to the detected abnormality. In one embodiment, when an overexposure abnormality is detected, the controller chip 142 can generate a feedback signal FB for the auto exposure parameter $P_{AE}$; when an out-of-focus abnormality is detected, the controller chip 142 can generate a feedback signal FB for the auto focus parameter $P_{AF}$; and when a white balance misalignment abnormality is detected, the controller chip 142 can generate a feedback signal FB for the auto white balance parameter $P_{AWB}$. The feedback signal FB is not limited to a single abnormality, but may also correspond to a plurality of abnormalities simultaneously.

At step S245G, the controller chip 142 transmits the feedback signal FB back to the image processor 126 of the webcam 120 via the transmission interface 148 and the transmission interface 128. At step S246G, the image processor 126 can correct the automatic photography parameters PA (the auto white balance parameter $P_{AWB}$, the auto exposure parameter $P_{AE}$, or the auto focus parameter $P_{AF}$ therein) according to the feedback signal FB to obtain a corrected automatic photography parameter. Subsequently, at step S247G, a corrected environmental image IMGc is generated according to the corrected automatic photography parameter. For example, the original environmental image IMG is recalculated algorithmically based on the corrected automatic photography parameter to obtain the corrected environmental image IMGc, alternatively, the environmental image is re-captured and then calculated algorithmically based on the corrected automatic photography parameter to obtain the corrected environmental image IMGc.

Next, at step S248G, the webcam 120 transmits the corrected environmental image IMGc to the controller chip 142 of the displayer 140. At step S249G, the controller chip 142 can output the display screen SCN to the display panel 144 according to the corrected environmental image IMGc.

Based on embodiments discussed above, the automatic photography parameter PA (e.g., the auto white balance parameter $P_{AWB}$, the auto exposure parameter $P_{AE}$, and the auto focus parameter $P_{AF}$) generated according to the environmental image IMG captured by the webcam 120 can be transmitted to the displayer 140 as a trigger signal and a judgment standard for the displayer 140 performing the automatic modulation function, in such a way, there is no need to bury additional optical sensors or proximity sensors in the displayer 140, which can save the manufacturing cost and space of the displayer 140, and can use the automatic photography parameter PA of the webcam 120 to achieve similar automatic modulation functions. Furthermore, the shooting range and angle of the webcam 120 (compared to the optical sensors or proximity sensors) are also less likely to be accidentally blocked, or the occurrence of accidental blocking is easier to be detected by users, which can avoid the automatic modulation function from being triggered incorrectly.

Although the present disclosure has been disclosed as above in embodiments, the embodiments are not intended to limit the present disclosure. Those of ordinary skill in the art may make various changes and embellishments without departing from the spirit and scope of the present disclosure. Therefore, the scope of protection of the present disclosure shall be defined in the attached claims.

What is claimed is:

1. An image processing method, comprising:

capturing an environmental image by a webcam;

calculating an automatic photography parameter according to the environmental image by the webcam, wherein the automatic photography parameter comprises at least one of an auto white balance parameter, an auto exposure parameter and an auto focus parameter;

transmitting the automatic photography parameter from the webcam to a controller chip of a displayer; and performing a modulation function by the controller chip according to the automatic photography parameter, so as to change a display screen on the displayer.

2. The image processing method according to claim 1, wherein the automatic photography parameter comprises the auto white balance parameter, and performing the modulation function by the controller chip according to the automatic photography parameter comprises:

obtaining an environmental color temperature according to the auto white balance parameter; and performing a display color temperature modulation function according to the environmental color temperature, so that a display color temperature of the display screen approaches the environmental color temperature.

3. The image processing method according to claim 1, wherein the automatic photography parameter comprises the auto white balance parameter and the auto exposure parameter, and performing the modulation function by the controller chip according to the automatic photography parameter comprises:

calculating an environmental blue light hazard value according to the auto white balance parameter and the auto exposure parameter;

calculating a screen blue light hazard value according to a data signal corresponding to the display screen;

performing a low blue light modulation function according to the environmental blue light hazard value and the screen blue light hazard value, and adjusting a red light gain value, a green light gain value and a blue light gain value by the low blue light modulation function; and changing a blue light intensity ratio of the display screen based on the red light gain value, the green light gain value and the blue light gain value.

4. The image processing method according to claim 1, wherein the automatic photography parameter comprises the auto exposure parameter, and performing the modulation function by the controller chip according to the automatic photography parameter comprises:

obtaining an environment brightness according to the auto exposure parameter; and performing a display brightness modulation function according to the environment brightness, so that a display brightness of the display screens is positively correlated with the environment brightness.

5. The image processing method according to claim 1, wherein the automatic photography parameter comprises the auto exposure parameter, and performing the modulation function by the controller chip according to the automatic photography parameter comprises:

obtaining an environment brightness according to the auto exposure parameter; and performing a partition dimming function according to the environment brightness, so that a maximum block brightness of a plurality of display blocks in the display screen is positively correlated with the environment brightness.

6. The image processing method according to claim 1, wherein the automatic photography parameter comprises the auto focus parameter, and performing the modulation function by the controller chip according to the automatic photography parameter comprises:

obtaining an object distance according to the auto focus parameter;

performing a health reminder function according to the object distance; and generating a prompt message according to the health reminder function, and outputting the prompt message by the displayer.

7. The image processing method according to claim 1, wherein the webcam transmits the automatic photography parameter together with the environmental image to the controller chip, and performing the modulation function by the controller chip according to the automatic photography parameter comprises:

performing an image processing function by the controller chip according to the automatic photography parameter, so as to generate a modulated environmental image according to the environmental image; and displaying the modulated environmental image on the display screen of the displayer.

8. The image processing method according to claim 1, wherein the webcam transmits the automatic photography parameter together with the environmental image to the controller chip, and performing the modulation function by the controller chip according to the automatic photography parameter comprises:

performing an image processing function by the controller chip according to the automatic photography parameter, so as to generate a modulated environmental image according to the environmental image;

determining, by the controller chip, whether the modulated environmental image is abnormal;

in response to that the modulated environmental image is determined to be abnormal, generating a feedback signal by the controller chip;

transmitting the feedback signal to the webcam by the controller chip;

correcting the automatic photography parameter by the webcam according to the feedback signal to generate a corrected automatic photography parameter;

generating a corrected environmental image by the webcam based on the corrected automatic photography parameter;

transmitting, by the webcam, the corrected environmental image to the controller chip of the displayer; and generating the display screen by the displayer according to the corrected environmental image.

9. An image processing system, comprising:

a webcam configured to capture an environmental image, the webcam comprising an image processor configured to calculate an automatic photography parameter according to the environmental image, the automatic photography parameter comprising at least one of an auto white balance parameter, an auto exposure parameter and an auto focus parameter; and a displayer, comprising:

a display panel; and a controller chip coupled to the display panel, the controller chip being communicatively connected to the image processor, the controller chip being configured to receive the automatic photography parameter from the image processor of the webcam, wherein the controller chip performs a modulation function according to the automatic photography parameter and outputs a display screen to the display panel according to a result of the modulation function.

10. The image processing system according to claim 9, wherein the automatic photography parameter comprises the auto white balance parameter, the controller chip obtains an environmental color temperature according to the auto white balance parameter, and the controller chip performs a display color temperature modulation function according to the environmental color temperature, so that a display color temperature of the display screen approaches the environmental color temperature.

11. The image processing system according to claim 9, wherein the automatic photography parameter comprises the auto white balance parameter, the controller chip is configured to calculate an environmental blue light hazard value according to the auto white balance parameter, the controller chip is configured to calculate a screen blue light hazard value according to a data signal corresponding to the display screen, the controller chip is configured to perform a low blue light modulation function according to the environmental blue light hazard value and the screen blue light hazard value, and a red light gain value, a green light gain value and a blue light gain value are adjusted by the low blue light modulation function, and the controller chip is configured to adjust a blue light intensity ratio of the display screen based on the red light gain value, the green light gain value and the blue light gain value.

12. The image processing system according to claim 9, wherein the automatic photography parameter comprises the auto exposure parameter, the controller chip is configured to obtain an environment brightness according to the auto exposure parameter, and the controller chip is configured to perform a display brightness modulation function according to the environment brightness, so that a display brightness of the display screen is positively correlated with the environment brightness.

13. The image processing system according to claim 9, wherein the automatic photography parameter comprises the auto exposure parameter; the controller chip is configured to obtain an environment brightness according to the auto exposure parameter; and the controller chip is configured to perform a partition dimming function according to the environment brightness, so that a maximum block brightness of a plurality of display blocks in the display screen is positively correlated with the environment brightness.

14. The image processing system according to claim 9, wherein the automatic photography parameter comprises the auto focus parameter, the controller chip is configured to obtain an object distance according to the auto focus parameter, the controller chip is configured to perform a health reminder function according to the object distance, and the controller chip is configured to generate a prompt message according to the health reminder function, and the displayer is configured to outputs the prompt message.

15. The image processing system according to claim 9, wherein the webcam is configured to transmit the automatic photography parameter together with the environmental image to the controller chip, the controller chip is configured to perform an image processing function according to the automatic photography parameter, so as to generate a modulated environmental image according to the environmental image, and the display screen is generated according to the modulated environmental image and transmitted to the display panel.

16. The image processing system according to claim 9, wherein the webcam is configured to transmit the automatic photography parameter together with the environmental image to the controller chip, the controller chip is configured to perform an image processing function according to the automatic photography parameter to generate a modulated environmental image according to the environmental image, the controller chip is configured to determine whether the modulated environmental image is abnormal, in response to that the modulated environmental image is abnormal, the controller chip is configured to generate a feedback signal, the controller chip is configured to transmit the feedback signal to the webcam, the webcam is configured to correct the automatic photography parameters according to the feedback signal to generate a corrected automatic photography parameter, the webcam is configured to captures a corrected environmental image based on the corrected automatic photography parameter, the webcam is configured to transmit the corrected environmental image to the controller chip of the displayer, and the displayer is configured to display the display screen according to the corrected environmental image.

17. The image processing system according to claim 9, wherein the webcam is an external webcam mounted outside the displayer.

18. The image processing system according to claim 9, wherein the webcam is a built-in webcam built in the displayer.

19. The image processing system according to claim 9, wherein the webcam is configured to transmit the automatic photography parameters to the controller chip through a universal serial bus, a high-definition multimedia interface, a network transmission interface, and an inter-integrated circuit ($I^2C$) or a serial peripheral interface bus (SPI).

20. A displayer comprising:

a display panel; and a controller chip coupled to the display panel, the controller chip being communicatively connected to a webcam, the controller chip being configured to receive an automatic photography parameter from the webcam, the controller chip performing a modulation function according to the automatic photography parameter and outputting a display screen to the display panel according to a result of the modulation function.

* * * * *